W. P. Hale,
Lath Machine.
No. 95,582. Patented Oct. 5, 1869.

Witnesses,
John A. Ells
A. H. Worth

Inventor,
Wm. P. Hales
Per
T. H. Alexander
Atty.

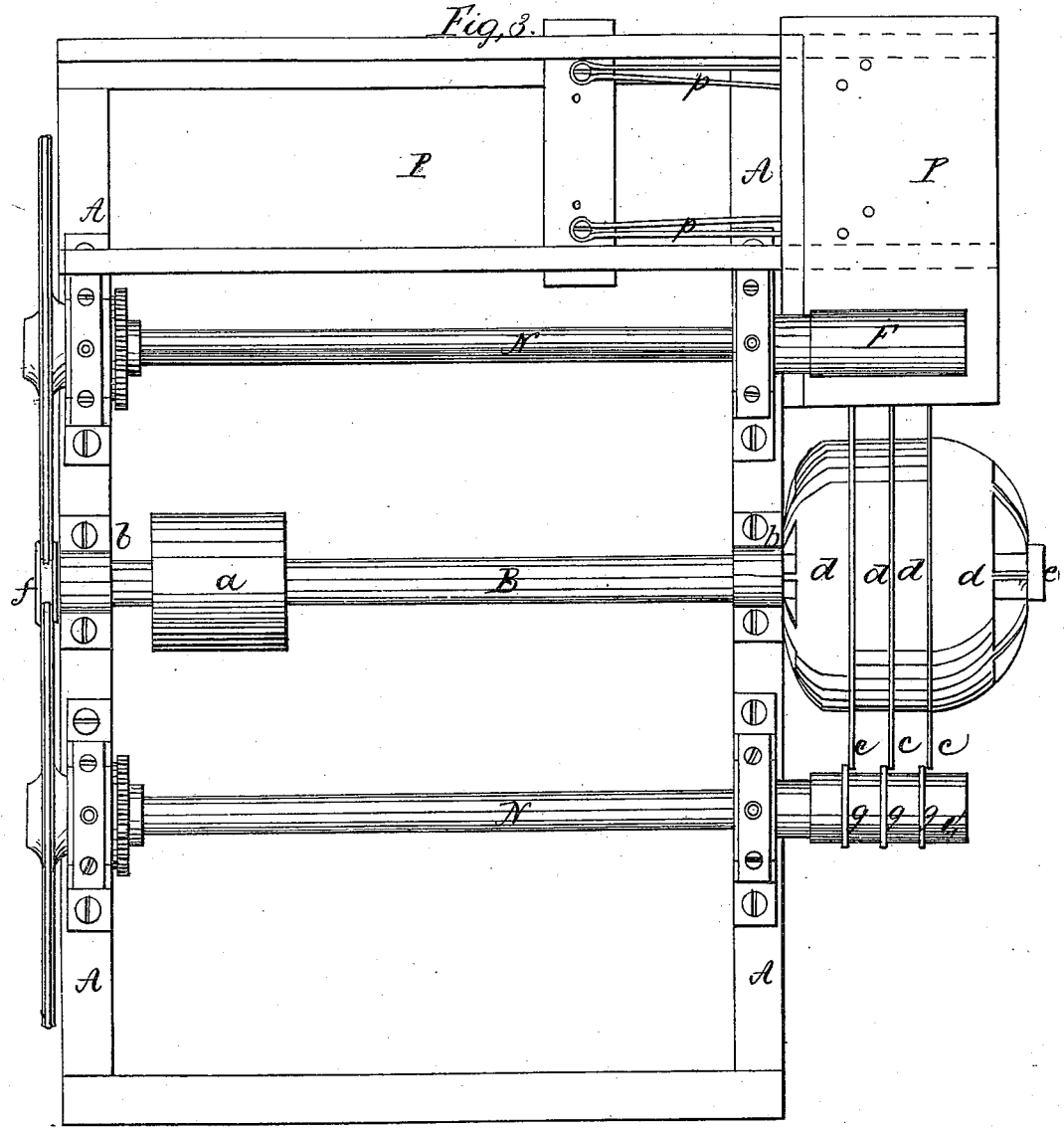

United States Patent Office.

WILLIAM P. HALE, OF IONIA, MICHIGAN.

Letters Patent No. 95,582, dated October 5, 1869.

IMPROVEMENT IN MACHINE FOR SAWING LATH.

The Schedule referred to in these Letters Patent and making part of the same.

*To all whom it may concern:*

Be it known that I, WILLIAM P. HALE, of Ionia, in the county of Ionia, and State of Michigan, have invented certain new and useful Improvements in Lath-Sawing Machine; and I do hereby declare that the following is a full, clear, and exact description thereof, reference being had to the accompanying drawings, and to the letters of reference marked thereon, which form a part of this specification, and in which—

Figure 1:
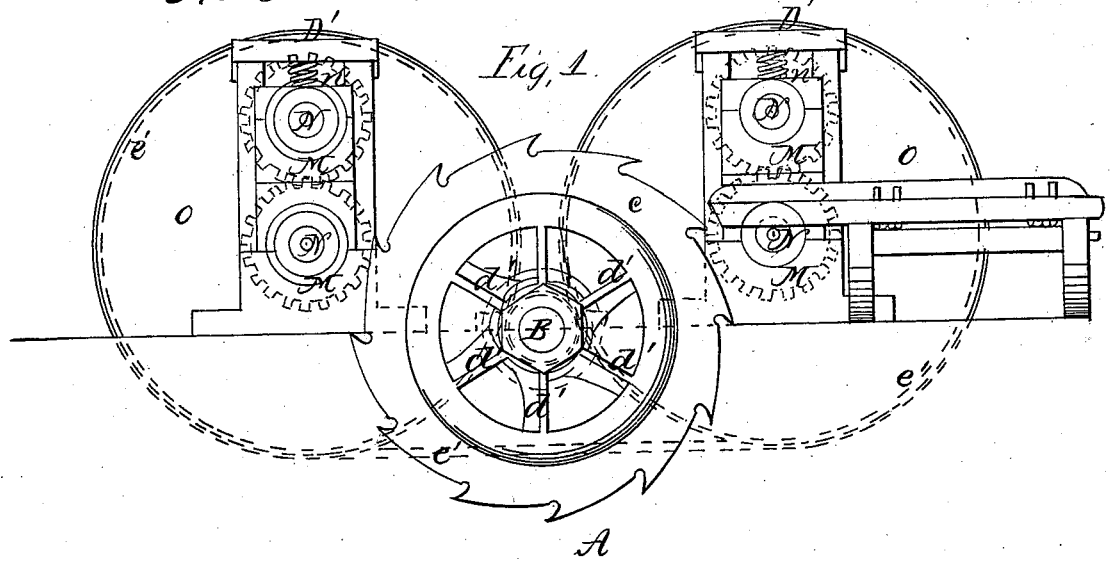
Figure 2:
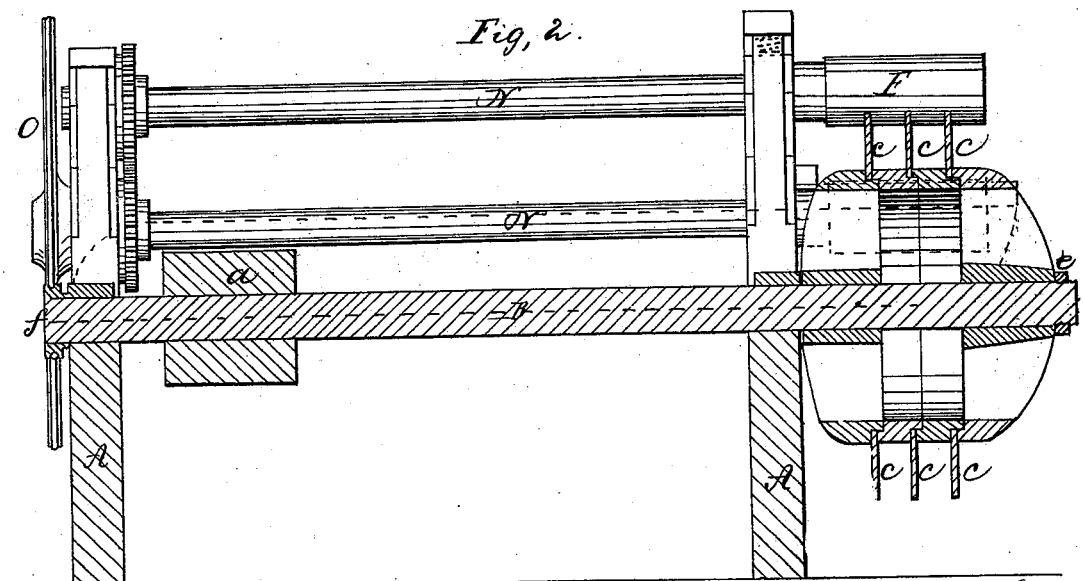

Figure 1 represents a side elevation of my machine.
Figure 2 is a central cross-section.
Figure 3 is a plan view.

The nature of my invention consists in the employment of two or more collars on the main or driving-shaft, by means of which the saws are held in position, and so arranged that one or more saws may be operated at a time.

It further consists in the peculiar construction of the platform for holding the lath-timber, in combination with other devices, the peculiarity of which will be hereafter described.

In the accompanying drawings—

A represents the frame of my machine, constructed in a rectangular shape.

B represents the main shaft, provided with driving-pulley $a$, which connects with the motive power.

The shaft B is secured in journals $b\ b$, attached to the upper surface of frame A.

On the projecting end of shaft B, and near the driving-pulley $a$, is secured the grooved pulley $f$, the object of which will be hereafter described.

On the opposite end of shaft B the saws $c\ c\ c$ are adjusted, and separated by means of hollow collars $d\ d\ d$, formed with slightly spiral arms, with an open space between them, so as to admit a free circulation of air through the collars $d\ d\ d$, and thus prevent the saws from heating.

The saws are held firmly in place by means of a nut, $e$, which presses against the outside collar $d$.

By this arrangement any number of saws may be attached to the projecting end of the shaft B.

D' D' D D represent four metal uprights, secured to the side of frame A by screw-bolts. (See fig. 1.)

In these uprights are placed the shafts N N N N, two being assigned to each pair of uprights, and working in journals, one above the other.

The followers, which confine the upper shafts in uprights D' D', are provided with a spiral spring, $n$, to keep the said followers in place, and give them the required pressure on the shaft.

F F represent rollers, on the ends of the shafts N N, opposite to the saws $c\ c\ c$.

The rollers marked G G, it will be observed, are provided with corresponding flanges, $g\ g\ g$, which are designed as guides to the laths after they have passed from the saw.

M M represent spur-wheels, secured to the shafts N N, for the purpose of giving motion to the rollers G G.

P represents a platform, resting at one end of the frame A.

$p\ p$ represent metal springs, the inner ends of which are secured to the frame A, and bent upward at right angles at their outer end, and then made to pass through holes in the platform P.

The ends projecting over the platform P are intended to act as guides to the lath-timber.

When it is desired to have the three saws cutting at the same time, the timber will press the guides down, and move on the smooth surface of the platform, being carried forward by the rollers F F.

$e'\ e'$ represent two grooved wheels, one being secured to the projecting end of each of the lower shafts N N.

The said wheels are put in motion by a band passing around the grooved pulley $f$, and the motion communicated to the upper shafts by the spur-wheels M M.

Having thus described my invention,

What I claim, and desire to secure by Letters Patent, is—

1. The hollow collars $d\ d\ d$, when constructed as and for the purpose substantially described.

2. The collars $d\ d\ d$, in combination with saws $c\ c\ c$, when the said saws are so constructed as to admit of a free circulation of air between their inner edge and the shaft B, substantially as set forth.

3. The platform P, when provided with springs $p\ p$, in the manner substantially as described.

In testimony that I claim the foregoing as my own, I affix my signature, in presence of two witnesses.

WILLIAM P. HALE.

Witnesses:
N. S. GOODRICH.
GEO. W. CROSBY.